United States Patent
Katayama (10) Patent No.: US 7,515,212 B2
(45) Date of Patent: Apr. 7, 2009

(54) DIGITAL BROADCAST RECEIVER

(75) Inventor: Takahiro Katayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 547 days.

(21) Appl. No.: 11/165,233

(22) Filed: Jun. 24, 2005

(65) Prior Publication Data

US 2005/0285980 A1  Dec. 29, 2005

(30) Foreign Application Priority Data

Jun. 25, 2004  (JP) ............... 2004-188954

(51) Int. Cl.
*H04N 5/50* (2006.01)
*H04N 5/60* (2006.01)

(52) U.S. Cl. ............ 348/738; 348/569; 348/462; 348/481

(58) Field of Classification Search ........... 348/569, 348/563–564, 465–468, 558, 61, 481, 462; 725/47, 39–40, 137
See application file for complete search history.

(56) References Cited

U.S. PATENT DOCUMENTS 6,128,434 A * 10/2000 Hirayama et al. ............ 386/97

2002/0083453 A1 * 6/2002 Menez ............ 725/47
2002/0140863 A1 * 10/2002 Park, II ............ 348/569
2003/0046075 A1 * 3/2003 Stone ............ 704/257

FOREIGN PATENT DOCUMENTS

JP   11-098434   4/1999
JP   2002-335467  11/2002

* cited by examiner

*Primary Examiner*—Trang U Tran
(74) *Attorney, Agent, or Firm*—Crowell & Moring LLP (57) ABSTRACT

A digital broadcast receiver selects a language in which captions are displayed on a monitor on the basis of a language designated by a user for caption output (caption selecting means). Further, the digital broadcast receiver selects a language in which audio is output through a speaker on the basis of a language designated for audio output (audio selecting means). The digital broadcast receiver is designed so that the language designated for caption output and the language designated for audio output are set as a designated language that is unified (designated language setting means). Therefore, a user can designate a language for caption output and a language for audio output at the same time in only one operation to input a designated language. Accordingly, the necessity for separately inputting a language designated for caption output and a language designated for audio output can be avoided to eliminate the inconvenience to a user.

4 Claims, 9 Drawing Sheets

| CAPTION LANGUAGE TABLE ||
|---|---|
| JAPANESE | CODE: 30 |
| GERMAN | CODE: 21 |

FIG. 5

| AUDIO LANGUAGE TABLE ||
|---|---|
| ENGLISH | CODE: 1 |
| SPANISH | CODE: 60 |
| GERMAN | CODE: 21 |
| JAPANESE | CODE: 30 |

```
MENU

TIMER    SET
    SOUND    SELECT
    VISUAL   SELECT
    TIMER    ON/OFF
```

FIG. 12

| CAPTION LANGUAGE TABLE ||
|---|---|
| 1 | TONGAN |
| 2 | GERMAN |

FIG. 13

| AUDIO LANGUAGE TABLE ||
|---|---|
| 1 | ENGLISH |
| 2 | SPANISH |

FIG. 14

| | | MENU DISPLAY | AUDIO OUTPUT | CAPTION DISPLAY |
|---|---|---|---|---|
| SETTING | ENGLISH | ENGLISH | ENGLISH | GERMAN |
| | SPANISH | SPANISH | SPANISH | GERMAN |
| | FRENCH | FRENCH | ENGLISH | GERMAN |

FIG. 15

| CAPTION LANGUAGE TABLE ||
|---|---|
| 1 | MALAY |

FIG. 16

| AUDIO LANGUAGE TABLE ||
|---|---|
| 1 | TONGAN |
| 2 | GERMAN |
| 3 | ENGLISH |
| 4 | SPANISH |

FIG. 17

| | | MENU DISPLAY | AUDIO OUTPUT | CAPTION DISPLAY |
|---|---|---|---|---|
| SETTING | ENGLISH | ENGLISH | ENGLISH | MALAY |
| | SPANISH | SPANISH | SPANISH | MALAY |
| | FRENCH | FRENCH | ENGLISH | MALAY |

DIGITAL BROADCAST RECEIVER

BACKGROUND OF THE INVENTION

1. Field of the Invention

The present invention relates to a digital broadcast receiver, and more particularly to a digital broadcast receiver that is capable of receiving digital broadcast signals containing information in a plurality of languages and extracting information in a user-designated language from the information in the plurality of languages so that a user can view and listen to the extracted information.

2. Description of the Related Art

In digital broadcasting, large amounts of information can be transmitted. Therefore, caption information and audio information have been provided in a plurality of languages, so that a user can designate a desired language from the available languages. For example, with respect to captions, it is known in the art to insert closed caption data into the vertical blanking interval of video signals. In digital broadcasting, it is easy to insert the caption data representing captions in a plurality of languages so that a user can view captions in a desired language (hereinafter, referred to as a language designated for caption output), which is designated in advance, on a display screen.

It is also known in the art to display on a monitor screen characters generated by a character generator, which is called an on-screen display (OSD), provided in a receiver. The characters to be displayed by the OSD can be also selected among a plurality of languages.

Further, in digital broadcasting, audio can be also easily provided in two or more languages so that a user can designate a desired language (hereinafter, referred to as a language designated for audio output) among the plurality of languages.

For example, Japanese laid-open patent publication 2002-335467 discloses a system including an EEPROM for storing which language a user has designated among a plurality of languages and an MPU for determining whether received language information indicates the availability of the user-designated language. If the language information indicates that the user-designated language is available, the system generates audio output in the language.

However, such a conventional digital broadcast receiver as described above requires a user to separately input a language designated for caption output and a language designated for audio output, which may be cumbersome for the user. The system disclosed in Japanese laid-open patent publication 2002-335467 is designed to allow a user to designate a plurality of languages having different priorities so as to utilize information in a lot of languages that is contained in received signals. However, such a system requires a plurality of operations each for input of a language designated for caption output and a plurality of operations each for input of a language designated for audio output, thus increasing the number of operations to be performed by a user. Accordingly, the system may cause further inconvenience to a user.

SUMMARY OF THE INVENTION

An object of the present invention is to provide a digital broadcast receiver that can avoid the necessity for separately inputting a language designated for caption output and a language designated for audio output so as to eliminate the inconvenience to a user.

According to an aspect of the present invention, a digital broadcast receiver comprises: a monitor for displaying, as an image, video data and caption data each extracted from digital broadcast signals received; a speaker for outputting, as audio, audio data extracted from the received digital broadcast signals; caption selecting means for selecting caption data representing captions in a certain language from the extracted caption data on the basis of a language designated by a user for caption output so as to cause the monitor to display captions based on the selected caption data; audio selecting means for selecting audio data representing audio in a certain language from the extracted audio data on the basis of a language designated by a user for audio output so as to cause the speaker to output audio based on the selected audio data; and designated language setting means for setting both the language designated for caption output and the language designated for audio output as a designated language that is unified.

The caption selecting means compares the designated language set by the designated language setting means with languages in which captions are available from the caption data extracted from the digital broadcast signals, and if the designated language is included in the languages in which the captions are available from the extracted caption data, the caption selecting means selects caption data representing captions in the designated language.

The audio selecting means compares the designated language set by the designated language setting means with languages in which audio is available from the audio data extracted from the digital broadcast signals, and if the designated language is included in the languages in which the audio is available from the extracted audio data, the audio selecting means selects audio data representing audio in the designated language.

In this configuration, a language designated for caption output, which serves as the basis for selection of caption data, and a language designated for audio output, which serves as the basis for selection of audio data, are set as a unified designated language. This allows a user to designate a language for caption output and a language for audio output at the same time in only one operation to input a designated language. Accordingly, the necessity for separately inputting a language designated for caption output and a language designated for audio output can be avoided to eliminate the inconvenience to the user.

Preferably, in the digital broadcast receiver, the designated language setting means allows setting of two or more designated languages having different priorities. This can make the best possible use of captions and/or audio in a plurality of languages represented by caption data and/or audio data in a digital broadcast. Further, since captions/audio in a language having a higher priority is provided to a user, the receiver can have improved usability.

Preferably, in the digital broadcast receiver, the caption selecting means compares designated languages set by the designated language setting means with languages in which captions are available from the caption data extracted from the digital broadcast signals, and if some or all of the designated languages are included in the languages in which the captions are available, the caption selecting means selects caption data representing captions in one of the some or all of the designated languages that has a highest priority, and if none of the designated languages is included in the languages in which the captions are available, the caption selecting means selects caption data representing captions in a most universal language among the languages in which the captions are available.

The audio selecting means compares the designated languages, which are set by the designated language setting means, with languages in which audio is available from the audio data extracted from the digital broadcast signals, and if some or all of the designated languages are included in the languages in which the audio is available, the audio selecting means selects audio data representing audio in one of the some or all of the designated languages that has a highest priority, and if none of the designated languages is included in the languages in which the audio is available, the audio selecting means selects audio data representing audio in a most universal language among the languages in which the audio is available.

The caption selecting means and the audio selecting means determine a match between the designated languages and the languages in which the captions or audio is available from the extracted caption or audio data as well as universality of a language based on numbers of language codes.

In this configuration, if none of user-designated languages is included in languages in which captions or audio is available from caption data or audio data extracted from digital broadcast signals, a more universal language is selected as a language in which captions or audio is provided to a user. This can avoid causing a situation in which a user cannot comprehend captions or audio at all.

Preferably, in the digital broadcast receiver, the designated language setting means causes a designated language setting screen, on which names of a plurality of languages selectable as a designated language are displayed with a cursor to be moved among the displayed language names, to appear on the monitor so that two or more designated languages having different priorities are set based on an operation of the cursor by a user.

In this configuration, when setting a designated language, the designated language setting screen on which names of a plurality of languages selectable as a designated language are displayed with a cursor to be moved among the displayed language names appears on the monitor to serve as a user interface. Accordingly, a user can easily input a designated language while looking at the designated language setting screen.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
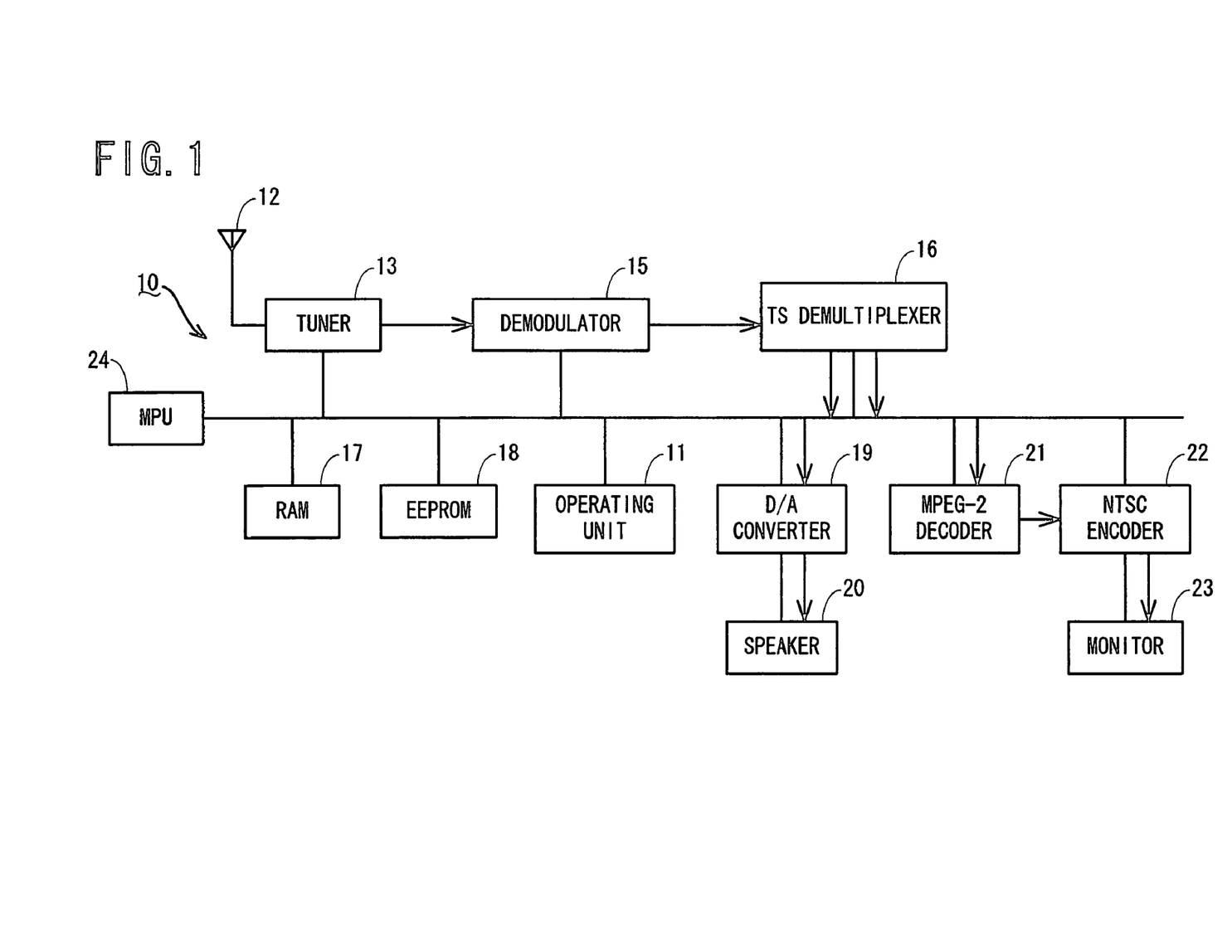
FIG. 1 is a block diagram of a digital broadcast receiver according to the present invention.

Referring now to FIG. 1, the configuration of a digital broadcast receiver 10 embodying the present invention is described. The receiver 10 includes an operating unit 11 to be operated by a user to power on or power off the receiver, to make channel selection or setting of a volume level, or to input a designated language, which is described in more detail later. The operating unit 11 generally has a portion for receiving signals from a remote controller (not shown) so that a user can perform the above described various operations by using the remote controller.

The receiver 10 further includes an antenna 12 to receive digital broadcast signals, a tuner 13 to select broadcast signals on a desired channel from the digital broadcast signals received by the antenna 12, and a demodulator 15 to demodulate output waves sent from the tuner 13 into data.

The receiver 10 further includes a transport stream (TS) demultiplexer 16 to divide the data demodulated by the demodulator 15 into e.g. video data, audio data, and caption data for output, a RAM 17 to store the divided data, an EEPROM 18 to store information about a designated language input by a user, a digital to analog (D/A) converter 19 to convert audio data contained in the data stored in the RAM 17 into analog data, and a speaker 20 to output the analog audio data sent from the D/A converter 19. It is to be noted that the caption data is not limited to data in a specific format but can be data in any format including closed caption data in accordance with EIA-708 standard.

Further, the receiver 10 includes an MPEG-2 decoder 21 to decode video data contained in the data stored in the RAM 17 into video data before compression, an NTSC encoder 22 to encode the decoded video data into NTSC television signals, a monitor 23 to display the NTSC television signals as images, and an MPU 24 to control the operations of the digital television receiver 10. The MPU 24 has a character generator to display various menus and captions based on caption data by OSD function. A menu or other information generated by the character generator is output via the NTSC encoder 22 to the monitor 23.

In this embodiment, a language designated for caption output and a language designated for audio output is set as a designated language that is unified, i.e., as a language designated for both caption output and audio output, as described below. Therefore, in the following description, a language designated for caption output and a language designated for audio output are referred to simply as a designated language without distinction of the two. It is to be noted that a language designated for caption output means a language that is designated in advance by a user for display of captions in the language and that serves as a basis for selection when, in a caption selecting process described below, selecting caption data representing captions in a certain language from caption data extracted from digital broadcast signals to output the selected caption data. A language designated for audio output means a language that is designated in advance by a user for output of audio in the language and that serves as a basis for selection when, in an audio selecting process described below, selecting audio data representing audio in a specific language from audio data extracted from digital broadcast signals to output the selected audio data. In this embodiment, two designated languages having different priorities are input by a user, so that information about the designated languages is stored in the EEPROM 18.

Figure 2:
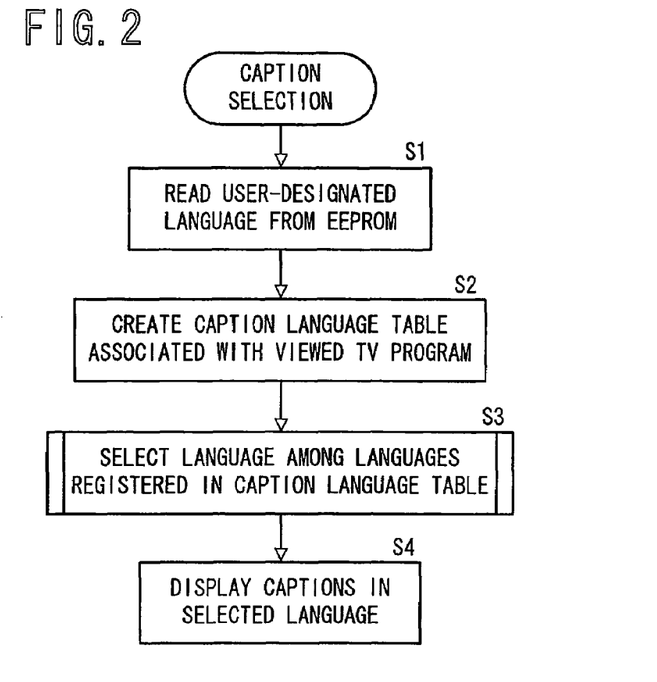
FIG. 2 is a flowchart showing a caption selecting process.

Referring now to FIG. 2, caption selecting means in the digital broadcast receiver 10 is described. The MPU 24 executes the caption selecting process shown in the flowchart of FIG. 2, thereby serving as the caption selecting means. It is to be noted that a program associated with the caption selecting process can be stored in any suitable location, e.g., in the EEPROM 18.

The caption selecting process is executed in the following steps. First, the MPU 24 reads information about designated languages from the EEPROM 18 (step S1). Next, the MPU 24 creates a table (hereinafter, referred to as a caption language table) having information about languages in which captions are available based on caption data extracted from digital broadcast signals on a channel being tuned (step S2).

Figure 4:
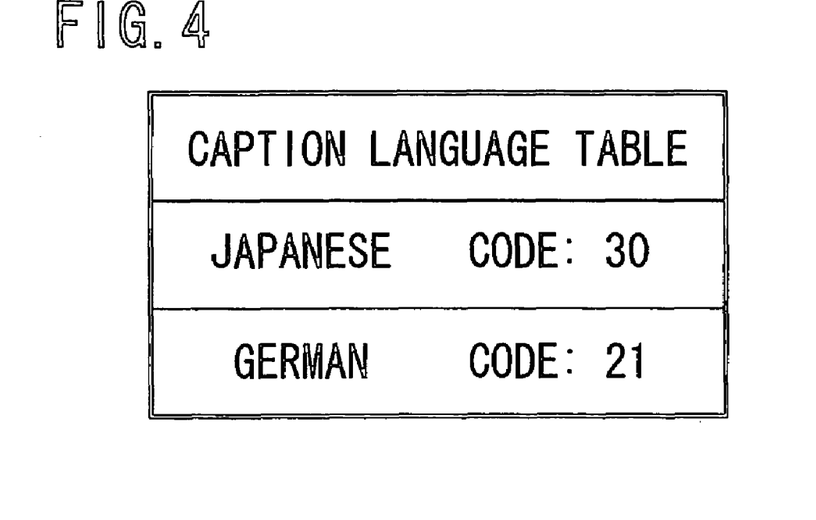
FIG. 4 is a diagram showing a caption language table.

As shown in FIG. 4, the languages in which captions are available from the extracted caption data are registered by the use of language codes in the caption language table. In this embodiment, the language code refers to a unique number assigned to each language for identification of the language.

Next, the MPU 24 compares the information about the designated languages that is read at the step S1 with the languages registered in the caption language table created at the step S2 so as to determine which language captions to display (step S3). Then, the MPU 24 generates captions in a language selected as a result of the determination (step S4). The step S3 is described later in more detail.

Figure 3:
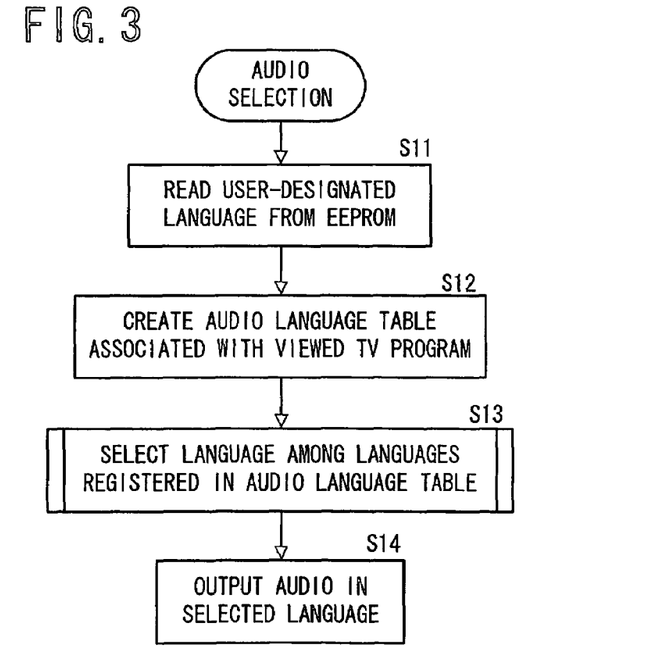
FIG. 3 is a flowchart showing an audio selecting process.

Referring now to FIG. 3, audio selecting means in the digital broadcast receiver 10 is described. The MPU 24 executes the audio selecting process shown in the flowchart of FIG. 3, thereby serving as the audio selecting means. It is to be noted that a program associated with the audio selecting process can be stored in any suitable location, e.g., in the EEPROM 18.

The audio selecting process is executed in the following steps. First, the MPU 24 reads information about designated languages from the EEPROM 18 (step S11). Next, the MPU 24 creates a table (hereinafter, referred to as an audio language table) having information about languages in which audio is available based on audio data extracted from digital broadcast signals on a channel being tuned (step S12).

Next, the MPU 24 compares the information about the designated languages that is read at the step S11 with the languages registered in the audio language table created at the step S12 so as to determine what language audio to output (step S13). Then, the MPU 24 causes audio in a language selected as a result of the determination to be output (step S14). The step S13 is described later in more detail.

Figure 5:
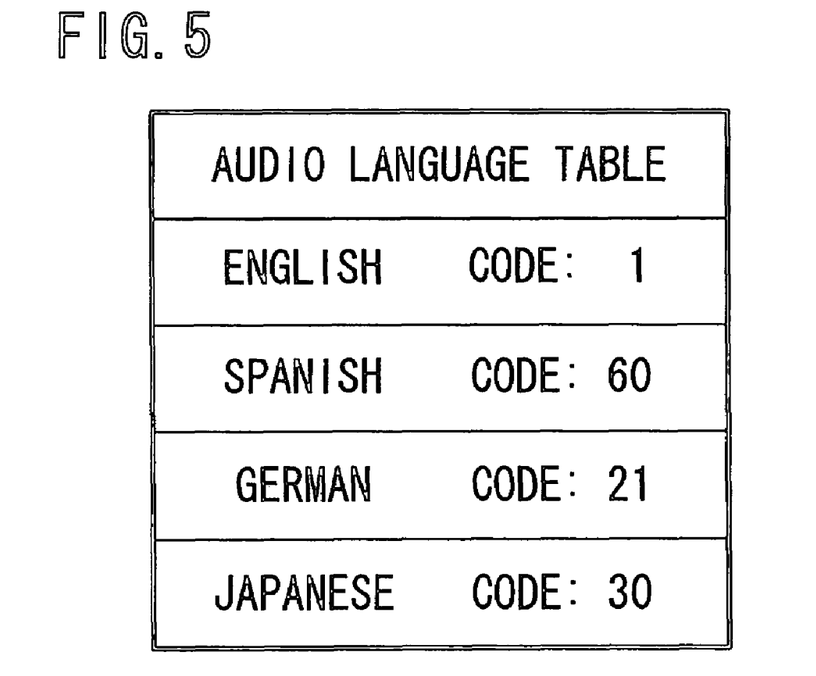
FIG. 5 is a diagram showing an audio language table.

As shown in FIG. 5, the languages in which audio is available from the extracted audio data are registered in the audio language table by the use of the language codes.

Figure 6:
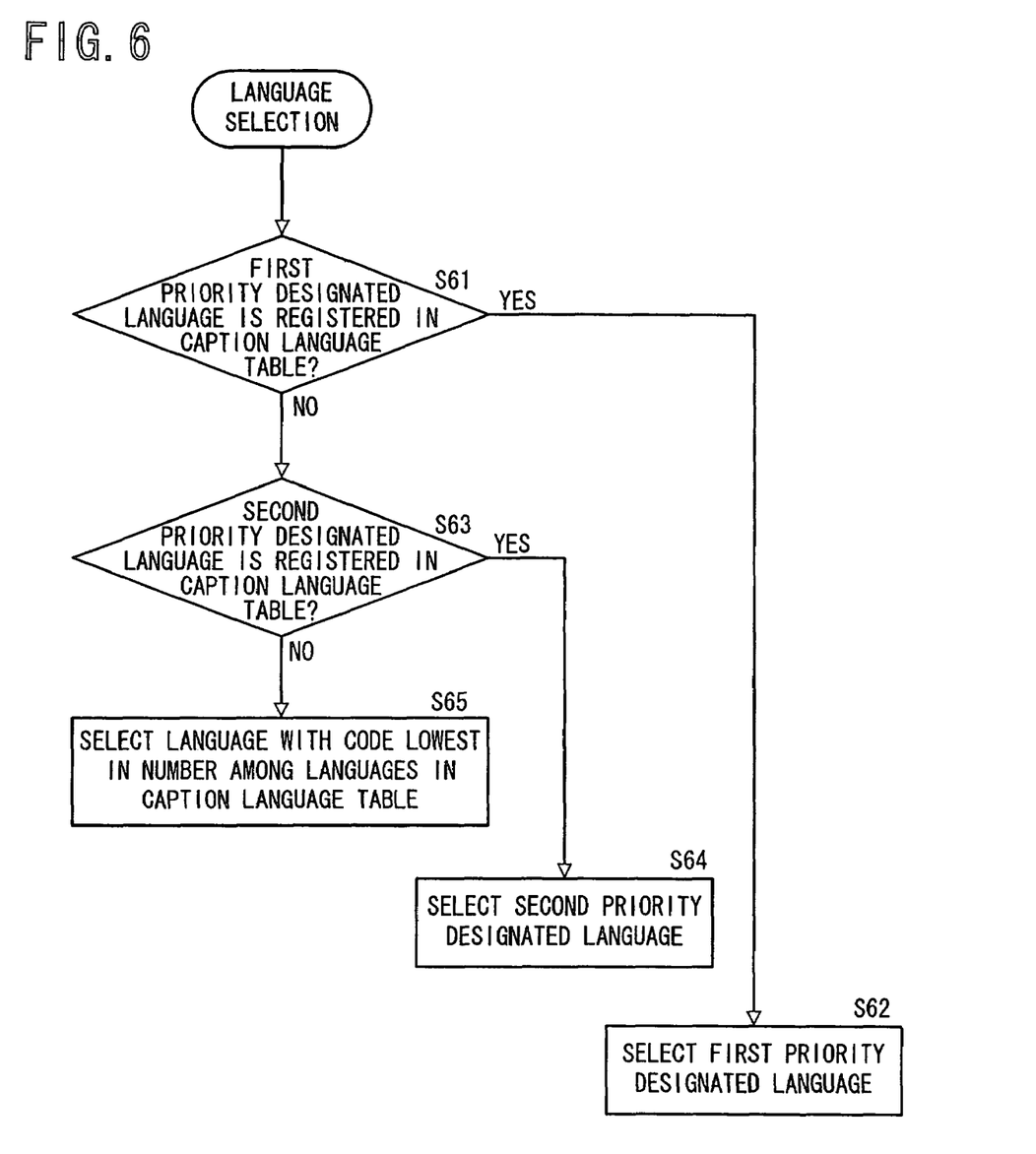
FIG. 6 is a flowchart showing a process of determining which language is selected for display of captions among languages listed a caption language table.

Referring now to FIG. 6, the details of the step S3 or S13 are described. Since the steps S3 and S13 are the same subroutines, only the step S3 (caption selecting process) is described in detail referring to the flowchart to avoid redundant description.

As described above, the EEPROM 18 stores information about two designated languages having different priorities. The MPU 24 first compares a designated language of a first priority with languages registered in the caption language table at step S61. If the first priority designated language is registered in the caption language table (YES at S61), the MPU 24 selects the first priority designated language as a language for display of captions (step S62). On the other hand, if the first priority designated language is not registered in the caption language table (NO at S61), the MPU 24 compares a designated language of a second priority with the languages registered in the caption language table (step S63). If the second priority designated language is registered in the caption language table (YES at S63), the MPU 24 selects the second priority designated language as the language for caption display (step S64). If NO at the step S63, i.e., if the second priority designated language is not registered in the caption language table, the MPU 24 selects a language with a code lowest in number among the languages in the caption language table so as to display captions in the selected language (step S65).

It is to be noted that a match/mismatch between the languages is determined based on the language codes. The language codes are assigned in accordance with the international standard. The number of a language code depends on the universality of the language (population using the language). More particularly, the more universal the language, the lower number of code is assigned. For example, English, German, and Spanish are assigned language codes "1", "21", and "60", respectively.

Referring now to FIG. 7 to FIG. 10, designated language setting means in the digital broadcast receiver 10 is described. The MPU 24 executes a designated language setting process described below, thereby serving as the designated language setting means.

Figure 7:
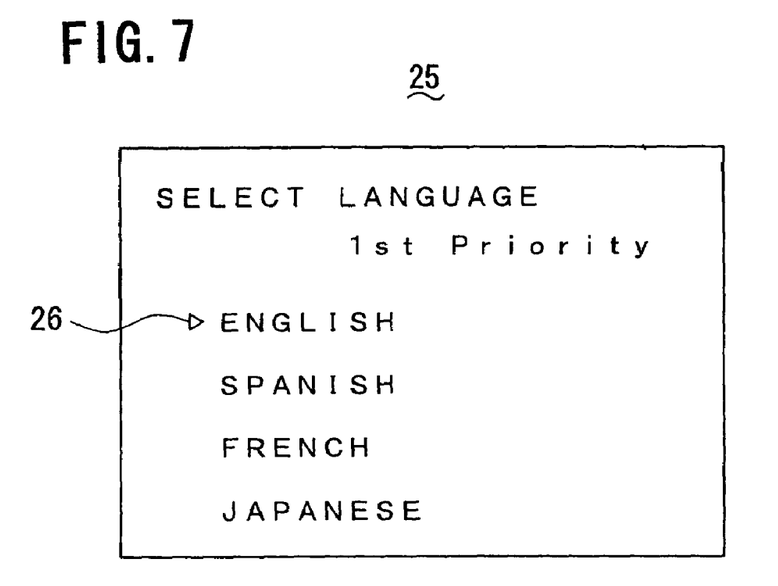
FIG. 7 is a diagram showing a designated language setting screen before a first priority designated language is set.

The following description is made as to the designated language setting process, referring to a menu screen (hereinafter, referred to as a designated language setting screen) that appears on the monitor when setting a designated language. The designated language setting screen 25 is generated by the character generator for output to the monitor 23.

Figure 8:
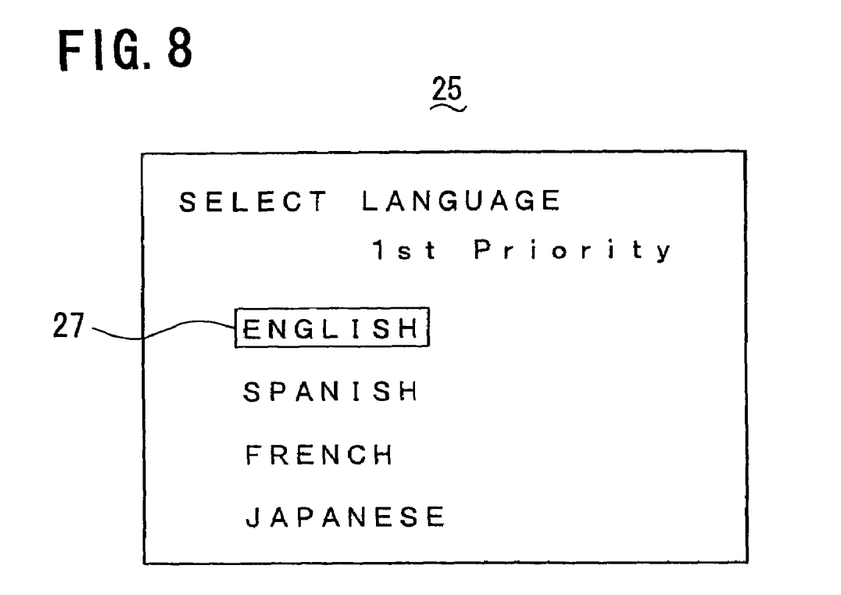
FIG. 8 is a diagram showing the designated language setting screen after the first priority designated language is set.

When starting the designated language setting process, the MPU 24 displays the designated language setting screen 25 shown in FIG. 7 on the monitor 23. Displayed in the designated language setting screen 25 are a plurality of language names "ENGLISH", "SPANISH", "FRENCH", and "JAPANESE" and a cursor 26. The cursor 26 can be moved up and down among the displayed four language names in response to operations of the remote controller by a user. In this state, the MPU 24 waits for a user to input a designated language of a first priority. When a user depresses an Enter key (not shown) on the remote controller, the MPU 24 causes a language where the cursor 26 is placed at that time ("ENGLISH" in the case where the Enter key is depressed in the state shown in FIG. 7) to be set as a first priority designated language. As shown in FIG. 8, once the first priority designated language is set, the MPU 24 displays a box 27 indicating the first priority designated language in the designated language setting screen 25 and stores information about the first priority designated language in the EEPROM 18. For example, when the Enter key is depressed in the state shown in FIG. 7, the displayed language name "ENGLISH" is surrounded by the box 27 as shown in FIG. 8, and information indicating that English is the first priority designated language is stored in the EEPROM 18.

Figure 9:
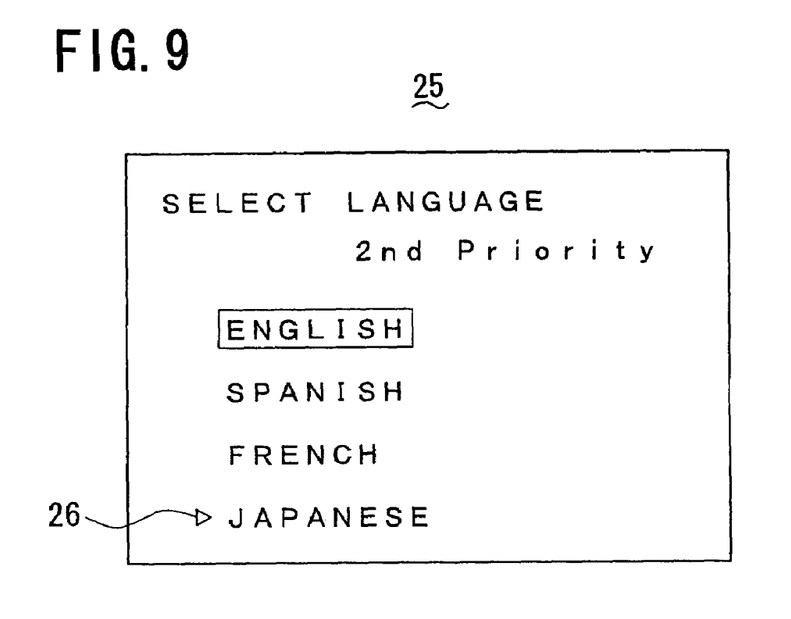
FIG. 9 is a diagram showing the designated language setting screen before a second priority designated language is set.
Figure 10:
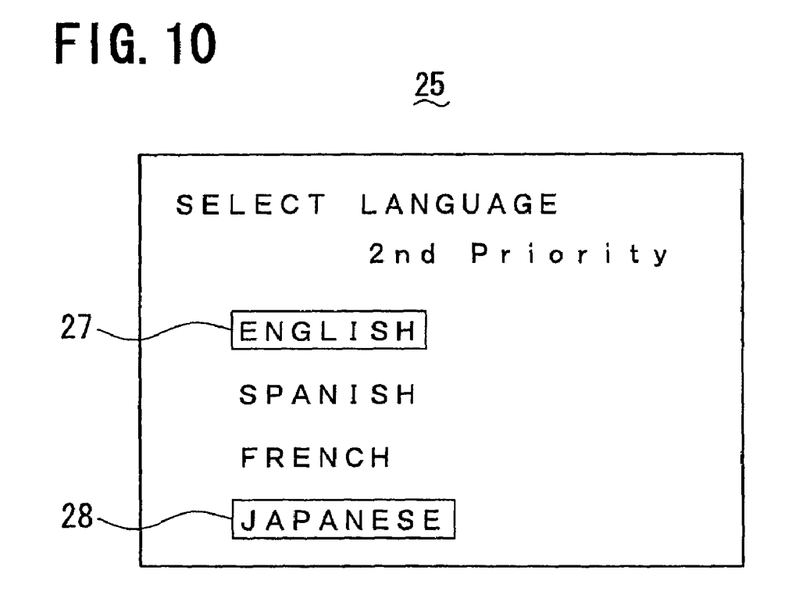
FIG. 10 is a diagram showing the designated language setting screen after the second priority designated language is set.

Next, the MPU 24 waits for a user to input a designate language of a second priority in the state shown in FIG. 9. In this state, when a user selects a secondly desired language among the rest three languages and depresses the Enter key again, the MPU 24 causes a language where the cursor 26 is placed at that time ("JAPANESE" in the case where the Enter key is depressed in the state shown in FIG. 9) to be set as a second priority designated language. As shown in FIG. 10, once the second priority designated language is set, the MPU 24 displays a box 28 indicating the second priority designated language in the designated language setting screen 25, and stores information about the second priority designated language in the EEPROM 18. For example, when the Enter key is depressed in the state shown in FIG. 9, the displayed language name "JAPANESE" is surrounded by the box 28 as shown in FIG. 10, and the information indicating that Japanese is the second priority designated language is stored in the EEPROM 18.

The boxes 27 and 28 indicating the first and second priority designated languages respectively may be distinguishable by color, shape, line width, or the like. It is also possible to design such that the displayed characters themselves change in color in response to the operations by a user.

Figure 11:
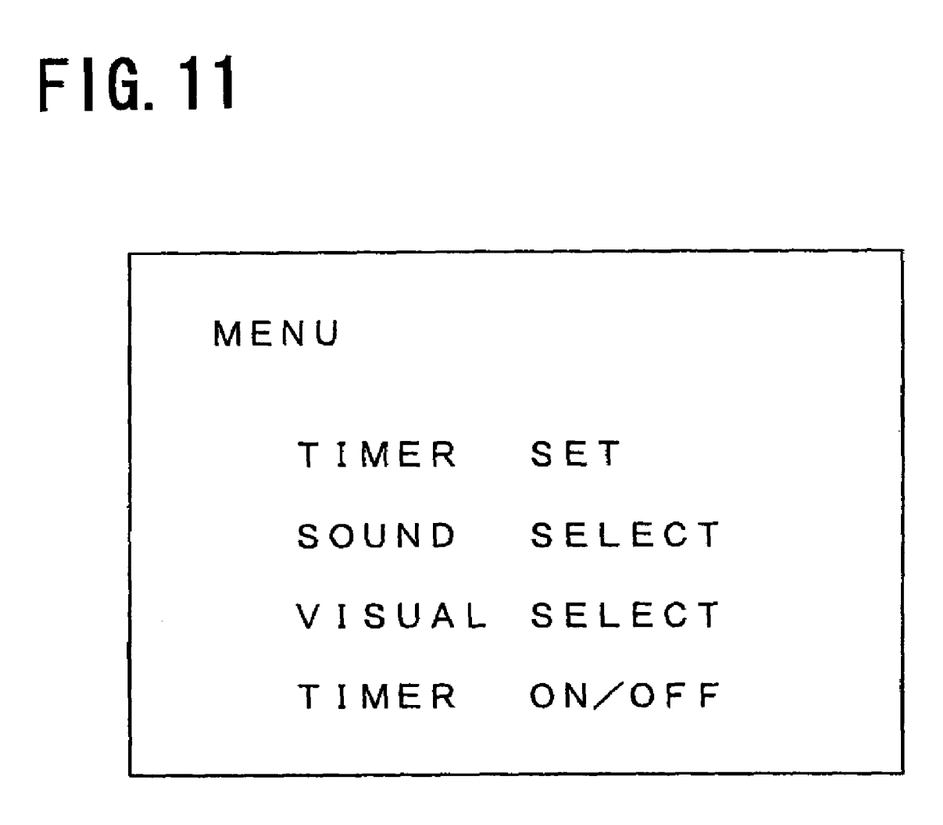
FIG. 11 is a diagram showing a main menu.

The character generator can generate various menus in each of the four languages (English, Spanish, French, and Japanese) listed in the designated language setting screen 25. After the first priority designated language is set in the designated language setting process, a menu in the first priority designated language is displayed on the monitor 23. FIG. 11 shows a sample menu displayed in English, which is a menu (hereinafter, referred to as a main menu) to be displayed when e.g. setting the timer.

Referring now to FIG. 4, FIG. 5, and FIG. 7 to FIG. 11, description is made as to how to set a designated language and view a TV program in the digital broadcast receiver 10. When powered on for the first time, the digital broadcast receiver 10 displays the designated language setting screen 25 shown in FIG. 7 on the monitor 23. Then, a user operates the remote controller to input a first priority designated language and a second priority designated language in accordance with instructions of the designated language setting screen 25 shown in FIGS. 7 to 10. When a user designates "ENGLISH" as the first priority designated language (see FIG. 8) and "JAPANESE" as the second priority designated language (see FIG. 10), information about the two designated languages is stored in the EEPROM 18.

When a user operates the receiver to view a TV program on a channel, caption selection and audio selection are executed as described above. More particularly, the language for captions is selected in the following manner. In the case as shown in FIG. 4 where Japanese and German are registered in the caption language table, since English that is the first priority designated language is not registered in the table, Japanese that is the second priority designated language is selected so that Japanese caption data are output to the monitor 23. Likewise, the language for audio is selected in the following manner. In the case as shown in FIG. 5 where English, Spanish, German, and Japanese are registered in the audio language table, since English that is the first priority designated language is registered in the audio language table, audio is output in English. When a user invokes the main menu for e.g. setting the timer, the main menu in English that is the first priority designated language is displayed as shown in FIG. 11.

Referring now to FIG. 12 to FIG. 17, description is made as to languages selected for captions, audio, and a menu in other examples that vary in designated language and languages registered in the caption language and audio language tables. To make the description concise, in the examples described below, only a first priority designated language is input by a user.

Figure 12:
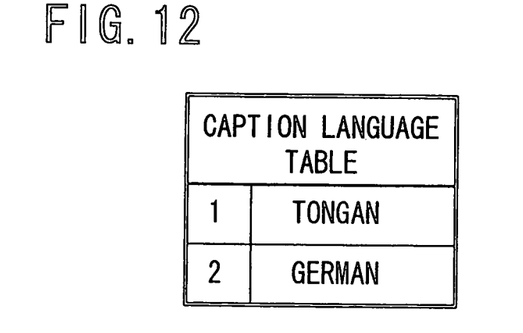
FIG. 12 is a diagram showing a caption language table associated with a TV program being viewed in Example 1.
Figure 13:
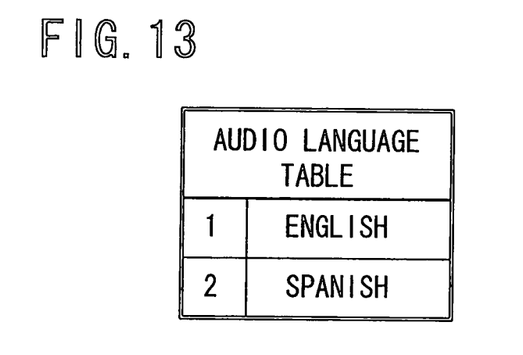
FIG. 13 is a diagram showing an audio language table associated with the TV program being viewed in Example 1.
Figure 14:
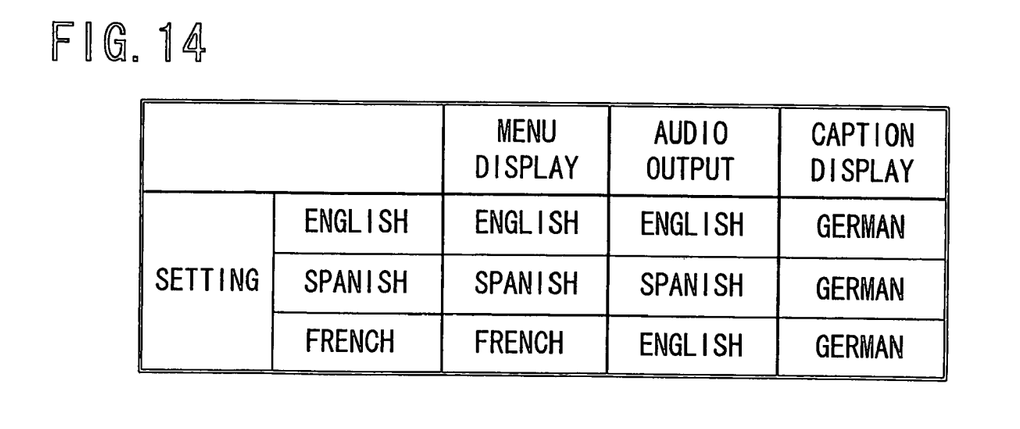
FIG. 14 is a diagram showing which language is selected for each output in the cases where a designated language is English, Spanish, and French in Example 1.

In the case as shown in FIGS. 12 and 13 where languages registered in the caption language table are Tongan and German and languages registered in the audio language table are English and Spanish (hereinafter, referred to as Example 1), each output varies depending on a designated language as follows. As shown in FIG. 14, if a user selects English as the designated language, captions and audio are provided in German and English, respectively. Further, when displaying a menu, the menu in English is generated for output. In Example 1, English is not registered in the caption language table. Therefore, of German and Tongan each registered in the caption language table, German is selected that has a language code lower in number (more universal).

If a user selects Spanish as the designated language, captions and audio are provided in German and Spanish, respectively. When displaying a menu, the menu in Spanish is generated for output. In Example 1, Spanish is not registered in the caption language table. Thus, German is selected to display German captions. Since Spanish is registered in the audio language table, audio is output in the designated Spanish.

If a user selects French as the designated language, captions and audio are provided in German and English, respectively. When displaying a menu, the menu in French is generated for output. In Example 1, since French is not registered in the caption language table, German is selected to display German captions. Further, French is not registered in the audio language table. Therefore, of English and Spanish each registered in the audio language table, English is selected that has a language code lower in number.

Figure 15:
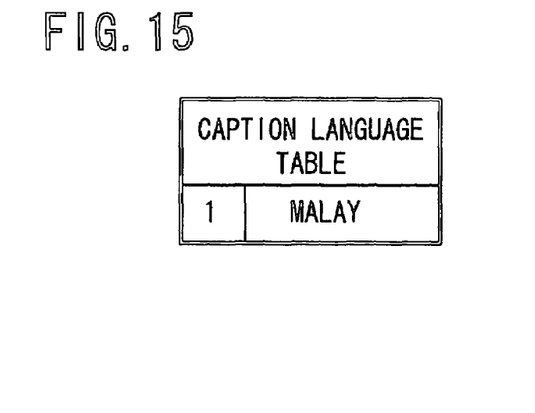
FIG. 15 is a diagram showing a caption language table associated with a TV program being viewed in Example 2.
Figure 16:
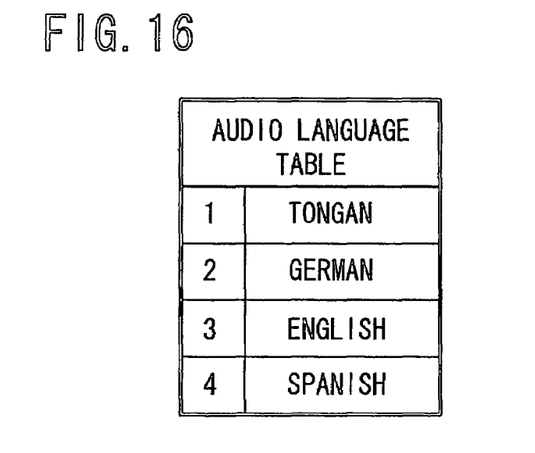
FIG. 16 is a diagram showing an audio language table associated with the TV program being viewed in Example 2.
Figure 17:
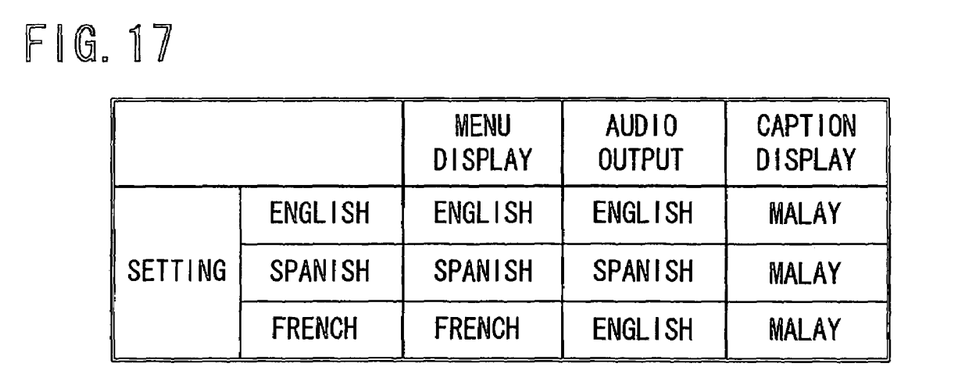
FIG. 17 is a diagram showing which language is selected for each output in the cases where a designated language is English, Spanish, and French in Example 2.

In the case as shown in FIGS. 15 and 16 where a language registered in the caption language table is Malay and languages registered in the audio language table are Tongan, German, English, and Spanish (hereinafter, referred to as Example 2), each output varies depending on a designated language as follows. As shown in FIG. 17, if a user selects English as the designated language, captions and audio are provided in Malay and English, respectively. Further, when displaying a menu, the menu in English is generated for output. In Example 2, English is not registered in the caption language table. Therefore, displayed are captions in Malay registered in the caption language table.

If a user selects Spanish as the designated language, captions and audio are provided in Malay and Spanish, respectively. When displaying a menu, the menu in Spanish is generated for output. In Example 2, Spanish is registered in the audio language table. Thus, audio in Spanish is output.

If a user selects French as the designated language, captions and audio are provided in Malay and English, respectively. When displaying a menu, the menu in French is generated for output. In Example 2, French is not registered in the audio language table. Therefore, of the four languages registered in the audio language table, English is selected that has a language code lowest in number (most universal).

The above described caption selecting and audio selecting processes are automatically executed at the time of channel selection by a user (or every time a viewed TV program changes to another one). It is also possible to design such that a user can change a language for captions/audio outputs by operating the remote controller after the automatic selection. More particularly, it is possible to design such that a user can switch a language for captions/audio outputs cyclically among languages recorded in the caption/audio language table by, for example, operating an up/down key provided on the remote controller. For example, in the case where English is selected as the designated language in Example 1 above, audio is automatically output in English by the above described audio selecting process, but a user can manually change the audio into Spanish by operating the remote controller. Likewise, in the case where English is selected as the designated language in Example 2 above, English audio is automatically output by the audio selecting process, but a user can change the audio into German or Spanish by depressing the up or down key on the remote controller.

The present invention has been described above using presently preferred embodiments, but those skilled in the art will appreciate that various modifications are possible. Accordingly, all such modifications are intended to be included within the spirit and scope of the present invention.

This application is based on Japanese patent application 2004-188954 filed Jun. 25, 2004, the contents of which are hereby incorporated by reference.

What is claimed is:

1. A digital broadcast receiver comprising:
    a monitor for displaying, as an image, video data and caption data each extracted from digital broadcast signals received;
    a speaker for outputting, as audio, audio data extracted from the received digital broadcast signals;
    caption selecting means for selecting caption data representing captions in a certain language from the extracted caption data on the basis of a language designated by a user for caption output so as to cause the monitor to display captions based on the selected caption data;
    audio selecting means for selecting audio data representing audio in a certain language from the extracted audio data on the basis of a language designated by a user for audio output so as to cause the speaker to output audio based on the selected audio data; and
    designated language setting means for setting both the language designated for caption output and the language designated for audio output as a designated language that is unified,
    wherein the caption selecting means compares the designated language set by the designated language setting means with languages in which captions are available from the caption data extracted from the digital broadcast signals, and if the designated language is included in the languages in which the captions are available from the extracted caption data, the caption selecting means selects caption data representing captions in the designated language;
    wherein the audio selecting means compares the designated language set by the designated language setting means with languages in which audio is available from the audio data extracted from the digital broadcast signals, and if the designated language is included in the languages in which the audio is available from the extracted audio data, the audio selecting means selects audio data representing audio in the designated language, wherein the designated language setting means allows setting of two or more designated languages having different priorities,
    wherein the caption selecting means compares the designated languages set by the designated language setting means with languages in which captions are available from the caption data extracted from the digital broadcast signals, and if some or all of the designated languages are included in the languages in which the captions are available, the caption selecting means selects caption data representing captions in one of the some or all of the designated languages that has a highest priority, and if none of the designated languages is included in the languages in which the captions are available, the caption selecting means selects caption data representing captions in a most universal language among the languages in which the captions are available;
    wherein the audio selecting means compares the designated languages, which are set by the designated language setting means, with languages in which audio is available from the audio data extracted from the digital broadcast signals, and if some or all of the designated languages are included in the languages in which the audio is available, the audio selecting means selects audio data representing audio in one of the some or all of the designated languages that has a highest priority, and if none of the designated languages is included in the languages in which the audio is available, the audio selecting means selects audio data representing audio in a most universal language among the languages in which the audio is available; and
    wherein the caption selecting means and the audio selecting means determine a match between the designated languages and the languages in which the captions or audio is available from the extracted caption or audio data as well as universality of a language based on numbers of language codes.

2. The digital broadcast receiver according to claim 1, wherein the designated language setting means causes a designated language setting screen, on which names of a plurality of languages selectable as a designated language are displayed with a cursor to be moved among the displayed language names, to appear on the monitor so that two or more designated languages having different priorities are set based on an operation of the cursor by a user.

3. A digital broadcast receiver comprising:
    a video output that provides an image, video data and caption data each extracted from received digital broadcast signals to a monitor;
    an audio output that provides as audio, audio data extracted from the received digital broadcast signals to a speaker; and
    a controller that
        selects caption data representing captions in a certain language from the extracted caption data on the basis of a language designated by a user for caption output so as to cause the monitor to display captions based on the selected caption data;
        selects audio data representing audio in a certain language from the extracted audio data on the basis of a language designated by a user for audio output so as to cause the speaker to output audio based on the selected audio data; and
        sets a first and second designated language for both the language designated for caption output and the audio output, the first and second designated languages each having an associated priority,
    wherein the controller compares the designated language with languages in which captions are available from the caption data extracted from the digital broadcast signals, and when the designated language is included in the languages in which the captions are available from the extracted caption data, the caption data representing captions in the designated language is selected, wherein the controller compares the designated language with languages in which audio is available from the audio data extracted from the digital broadcast signals, and when the designated language is included in the languages in which the audio is available from the extracted audio data, the audio data representing audio in the designated language is selected, compares the first and second designated languages with languages in which captions are available from the caption data extracted from the digital broadcast signals, and when some or all of the designated languages are included in the languages in which the captions are available, caption data representing captions in one of the some or all of the designated languages that has a highest priority is selected, and when none of the designated languages is included in the languages in which the captions are available, caption data representing captions in a most universal language among the languages in which the captions are available is selected, compares the first and second designated languages with languages in which audio is available from the audio data extracted from the digital broadcast signals, and when some or all of the designated languages are included in the languages in which the audio is available, audio data representing audio in one of the some or all of the designated languages that has a highest priority is selected, and when none of the designated languages is included in the languages in which the audio is available, audio data representing audio in a most universal language among the languages in which the audio is available is selected, and determines a match between the first and second designated languages and the languages in which the captions or audio is available from the extracted caption or audio data as well as universality of a language based on numbers of language codes.

4. The digital broadcast receiver according to claim 3, wherein the controller causes a designated language setting screen, on which names of a plurality of languages selectable as a designated language are displayed with a cursor to be moved among the displayed language names, to appear on the monitor so that two or more designated languages having different priorities are set based on an operation of the cursor by a user.

* * * * *